(12) United States Patent
Hou et al.

(10) Patent No.: US 10,058,874 B2
(45) Date of Patent: Aug. 28, 2018

(54) LOW-CALCIUM SILICATE CEMENT AND PREPARATION AND HARDENING METHODS THEREOF

(71) Applicant: YANCHENG INSTITUTE OF TECHNOLOGY, Yancheng (CN)

(72) Inventors: Guihua Hou, Yancheng (CN); Bao Lu, Yancheng (CN); Xiaojiao Gao, Yancheng (CN); Qinfang Zhang, Yancheng (CN); Yuebin Cao, Yancheng (CN); Entian Cui, Yancheng (CN); Zetian Tao, Yancheng (CN); Ruiyu Jiang, Yancheng (CN); Feng Zhang, Yancheng (CN)

(73) Assignee: YANCHENG INSTITUTE OF TECHNOLOGY, Yancheng (CN)

( * ) Notice: Subject to any disclaimer, the term of this patent is extended or adjusted under 35 U.S.C. 154(b) by 0 days.

(21) Appl. No.: 15/571,248

(22) PCT Filed: Sep. 25, 2015

(86) PCT No.: PCT/CN2015/091004
§ 371 (c)(1),
(2) Date: Nov. 1, 2017

(87) PCT Pub. No.: WO2017/016062
PCT Pub. Date: Feb. 2, 2017

(65) Prior Publication Data
US 2018/0111875 A1     Apr. 26, 2018

(30) Foreign Application Priority Data
Jul. 28, 2015   (CN) .......................... 2015 1 0452735

(51) Int. Cl.
| | |
|---|---|
| *B02C 23/00* | (2006.01) |
| *B02C 23/38* | (2006.01) |
| *C04B 7/02* | (2006.01) |
| *B02C 23/08* | (2006.01) |
| *C04B 7/34* | (2006.01) |
| *C04B 7/47* | (2006.01) |
| *C04B 7/52* | (2006.01) |
| *C04B 40/02* | (2006.01) |

(52) U.S. Cl.
CPC ............. *B02C 23/38* (2013.01); *B02C 23/00* (2013.01); *B02C 23/08* (2013.01); *C04B 7/02* (2013.01); *C04B 7/34* (2013.01); *C04B 7/47* (2013.01); *C04B 7/527* (2013.01); *C04B 40/0231* (2013.01); *H05K 999/99* (2013.01)

(58) Field of Classification Search
CPC .......... B02C 23/00; B02C 23/08; B02C 23/38
USPC ..................................................... 241/23, 29
See application file for complete search history.

(56) References Cited

U.S. PATENT DOCUMENTS

| | | | |
|---|---|---|---|
| 2012/0012034 A1* | 1/2012 | Guynn .................... | B02C 21/00 106/709 |
| 2016/0046525 A1* | 2/2016 | Schuermann ......... | C04B 7/4446 106/796 |

FOREIGN PATENT DOCUMENTS

| | | |
|---|---|---|
| CN | 102249576 A | 11/2011 |
| CN | 103086655 A | 5/2013 |
| CN | 104044204 A | 9/2014 |
| CN | 104844022 A | 8/2015 |

OTHER PUBLICATIONS

Shi Caijun, et al, 2010 The Study on Kinetics of Curing. Journal of the Chinese Ceramic. 997:6-10.
Tan, Ping, et al 2004 Portland cement in the use and conservation process of chemical reactions. Henan Chemical 8: 48-49.
Liu, Songhui, et al 2014 Study on Key Technology of High Strength and Low Calcium Portland Cement. Cement engineering 3: 22-23 and 73.
Li, Qingfeng 2015 Experimental Study on Carbon Dioxide—curing Recycled Aggregate Cement Concrete. Hunan Transportation Technology 2: 53-56.

* cited by examiner

*Primary Examiner* — Faye Francis
(74) *Attorney, Agent, or Firm* — CBM Patent Consulting, LLC

(57) ABSTRACT

A low-calcium silicate cement consists of calcium oxide, silica, alumina, and iron oxide. A preparation method of the low-calcium silicate cement consists of: subjecting raw materials to crushing, joint grinding and uniform mixing to obtain a low-calcium silicate cement raw meal; calcining the above low-calcium silicate cement raw meal at 1050-1300° C. for 30-90 min, and cooling to obtain low-calcium silicate cement clinker; and levigating the above low-calcium silicate cement clinker till a specific surface area is 400-500 $m^2$/Kg, thereby obtaining a low-calcium silicate cement.

4 Claims, No Drawings

LOW-CALCIUM SILICATE CEMENT AND PREPARATION AND HARDENING METHODS THEREOF

This application is the U.S. national phase of International Application No. PCT/CN2015/091004 filed on 29 Sep. 2015 which designated the U.S. and claims priority to Chinese Application Nos. CN201510452735.2 filed on 28 Jul. 2015, the entire contents of each of which are hereby incorporated by reference.

TECHNICAL FIELD

The invention belongs to the inorganic cementing material field, and specifically relates to a low-calcium silicate cement and preparation and hardening methods thereof.

BACKGROUND ART

Silicate cement is an important raw material for industrial and civil constructions. However, production of the existing cement is featured in high heat consumption and large exhaust emissions, which is one of the main sources of China's industrial energy consumption and exhaust emissions. Limestone is a main raw material for the production of silicate cement, and the pyrolysis of limestone will produce calcium oxide and carbon dioxide. The content of calcium oxide in the traditional silicate cement clinker is about 65%, and the carbon dioxide produced by decomposition of limestone is about 511 kg/t clinker, so the carbon dioxide emission in the process of calcining the cement clinker is mostly derived from the decomposition of calcium carbonate. In addition, the heat consumption for the decomposition of limestone accounts for about 60% of the cement clinker. In the prior art, ordinary silicate cement mainly has defects of a high calcination temperature (>1350° C.) and a large adulterate amount (about 82% of the mass of cement raw meal) of limestone in cement raw meals, and thus a large amount of fuel consumption results in not only high energy consumption but also large emissions of carbon dioxide and exhaust gases thereof, which will not only lead to the rapid consumption of natural resources, but also greatly pollute the environment.

Reduction in content of calcium oxide in clinker is beneficial to the decrease in the heat consumption of cement clinker and in the emissions of carbon dioxide and exhaust gases, and turns limestone mines with a low calcium oxide content and some industrial wastes with higher calcium oxide content into available raw materials, so the study of low-calcium silicate cement clinker and hardening of cement is of significant importance.

SUMMARY OF THE INVENTION

Object of the invention: An object of the invention is to provide a low-calcium silicate cement, and to provide a preparation method and a hardening method thereof.

Technical solution: To fulfill the aforementioned object, the invention provides a low-calcium silicate cement, comprising: based on the total mass of oxides as 1, 50-60% of calcium oxide, 30-45% of silica, 2-6% of alumina, and 1-4% of iron oxide. The invention is characterized in that raw materials used are calcium carbonate mainly comprising calcium oxide, a clay material mainly comprising silica and alumina, and an iron oxide material mainly comprising iron oxide. The three raw materials, i.e., the calcium carbonate, the clay material and the iron oxide material can be natural minerals or industrial residues.

To obtain the aforementioned low-calcium silicate cement, the invention provides a specific preparation method as below: determining the composition of raw materials according to target components, and then subjecting the raw materials to crushing, joint grinding and uniform mixing to obtain low-calcium silicate cement raw meal; calcining the above low-calcium silicate cement raw meal at 1050-1300° C. for 30-90 min, cooling to obtain low-calcium silicate cement clinker; and levigating the above low-calcium silicate cement clinker till a specific surface area is 400-500 $m^2$/Kg, preferably 450-500 $m^2$/Kg, thereby obtaining a low-calcium silicate cement.

The crushing in the above preparation process is performed by controlling the particle diameter of raw materials less than 10 mm. The grinding in the above preparation process is performed till a specific surface area is up to 300-350 $m^2$/Kg.

The cooling in the above preparation process may be quick cooling or natural cooling. During quick cooling, the temperature reduces 200° C. per minute. Natural cooling is cooling in a natural state. Quick cooling is used in the process of producing all conventional cement clinker because slow cooling enables tricalcium silicate in the clinker to decompose into dicalcium silicate and calcium oxide, so as to deteriorate the cement properties, while the invention breakthroughs conventional restrictions, and cooling can be performed in a natural state without deteriorating properties of an obtained product. On the other hand, with adoption of a natural cooling method, using quick cooling equipment necessary for production of conventional cement clinker will be not required.

The invention is further characterized in that $CO_2$-containing gas generated when calcining the low-calcium silicate cement raw meal in the above-mentioned preparation process can be used in a hardening process.

The invention further provides a hardening method of the low-calcium silicate cement, specifically comprising adding water to the low-calcium silicate cement, compression molding to obtain a test block, and introducing carbonaceous gas into the test block, thereby obtaining a hardened test block. A mass ratio of the added water to the solid (low-calcium silicate cement) is 0.1-0.3:1, preferably 0.1-0.15:1 or 0.25-0.3:1. During the hardening of the cement of the invention, water plays a different role in comparison with that during the hardening of conventional silicate cement, that is, water in the cement of the invention does not participate in the chemical reaction, and a hardened product is free of an aqueous product.

The invention produces the product by carbonization of $CO_2$, so that the cement is carbonized and bonded into a test block with mechanical strength. The carbonaceous gas in the above process may be $CO_2$ or $CO_2$-containing exhaust gas from industrial furnace. Preferably, it may be $CO_2$-containing gas generated during the calcination of the low-calcium silicate cement in the invention. The temperature of the carbonaceous gas may be in the range of 60° C. to 280° C., preferably 60° C. to 180° C., and more preferably 90° C. to 150° C.

Beneficial effects: 1. The product according to the invention has a low-content calcium oxide and a good mechanical property.

2. The preparation method according to the invention boats a low calcination temperature, and low carbon dioxide (about 15% lower) and exhaust emissions (about 25% lower) and low heat consumption in calcination (about 15% lower) in comparison with conventional silicate cement preparation methods. If the $CO_2$-containing gas generated during the calcination of the low-calcium silicate cement raw meal is considered to be used in the hardening process of the cement of the invention, the total exhaust emission will be reduced by not less than 40%. Considering that the clinker has a self-pulverization characteristic so as to greatly reduce the energy consumption of grinding the clinker, compared with the traditional silicate cement production, energy conservation is not less than 30%.

3. The hardening method according to the invention generates the product by carbonization of $CO_2$, so that the cement is carbonized and bonded into a test block with mechanical strength, and cyclic utilization of $CO_2$ is achieved.

DESCRIPTION OF PREFERRED EMBODIMENTS

The invention selects three kinds of raw materials, i.e., calcium carbonate essentially comprising calcium oxide, a clay material essentially comprising silica and alumina, and an iron oxide material essentially comprising iron oxide. The three raw materials, i.e., the calcium carbonate, the clay material and the iron oxide material can be natural minerals or industrial residues. Specific steps are as follows:

Step 1: the three raw materials are subjected to crushing, joint grinding, and levigating till a specific surface area is up to 300-350 $m^2$/Kg; the raw materials are uniformly mixed to obtain low-calcium silicate cement raw meal, with the goal of enabling mass proportions of the three raw material contained in the low-calcium silicate cement raw meal to meet the following requirements: 50-60% of calcium oxide, 30-45% of silica, 2-7% of alumina, and 1-4% of iron oxide, a sum being 100% based on the mass of oxides.

Step 2: the low-calcium silicate cement raw meal is calcined at 1050-1300° C. for 30-90 min, where the calcining is conducted in a shaft kiln, a rotary kiln, or a tunnel kiln. After calcining, an essential mineral of the clinker, i.e., tricalcium disilicate is cooled to obtain low-calcium silicate cement clinker. A cooling method can be quick cooling (cooling by 200-300° C. per minute) or natural cooling.

Step 3: the low-calcium silicate cement clinker is levigated till a specific surface area is 400-500 $m^2$/Kg, thereby obtaining a low-calcium silicate cement.

Step 4: a certain amount of water is added into the low-calcium silicate cement, with a mass ratio of the water to the solid (low-calcium silicate cement) of 0.1-0.3:1. The cement is compressed into a test block having a certain shape, and the test block reacts with 60° C.-150° C. $CO_2$ or 60° C.-280° C. $CO_2$-containing exhaust gas from industrial furnace for a certain time to obtain a hardened test block with a certain mechanical property.

In comparison with the conventional silicate cement, in the foregoing process, the carbon dioxide emission reduces about 15%, the exhaust emission reduces about 25%, and the heat consumption in calcination reduces about 15%.

Another embodiment in the foregoing process is to apply the $CO_2$-containing gas produced during the calcination in step 2 to the hardening process of the cement in step 4, in which a total exhaust emission will reduce by no less than 40%.

The invention will be described below in further details by several typical embodiments.

Embodiment 1

Limestone, clay and iron powder commonly used in current silicate cement-manufacturing plants were selected as raw materials, wherein a calcareous raw material was 1000 g, including 50% of calcium oxide; an argillaceous raw material was 600 g, including 68% of silica and 12% of alumina, respectively; an iron oxide raw material was 45 g, including 45% of iron oxide. The above-mentioned three raw materials were crushed respectively, so that the particle diameter was less than 10 mm, and then the raw materials are mixed, jointly ground, and levigated till a specific surface area was 300 $m^2$/Kg, and are uniformly mixed to obtain low-calcium silicate cement raw meal. The raw meal contained 50% of calcium oxide, 41% of silica, 7% of alumina, and 2% of iron oxide, a sum being 100% based on the mass of oxides.

The above low-calcium silicate cement raw meal was put in a rotary or shaft kiln and calcined at 1050° C. for 90 min, and then quick cooled in air with the temperature reduced at 200° C. per minute, thereby obtaining low-calcium silicate cement clinker.

The above low-calcium silicate cement clinker was ground, and levigated till a specific surface area was 400 $m^2$/Kg, thereby obtaining a low-calcium silicate cement.

A certain amount of water was added into the above low-calcium silicate cement with a mass ratio of the water to the solid (hereinafter referred to as water-solid ratio) being 0.25, the cement was compressed into a test block of 2×2×2 cm, the test block was placed in an agitated reactor with introduced $CO_2$ gas for carbonization at 60° C. for 1d, and the volume expansion ratio and compressive strength of the test block were 5.1% and 16.8 MPa, respectively. After the test block was carbonized at the same temperature for 3d, the volume expansion ratio and compressive strength of the test block were 8.3% and 24.7 MPa, respectively.

Embodiment 2

Limestone, clay and iron powder commonly used in the current silicate cement-manufacturing plants were selected as raw materials, wherein a calcareous raw material was 1200 g, including 50% of calcium oxide; an argillaceous raw material was 485 g, including 68% of silica and 12% of alumina, respectively; an iron oxide raw material was 55 g, including 45% of iron oxide. The above-mentioned three raw materials were crushed respectively, so that the particle diameter was less than 10 mm, and then the raw materials were mixed, jointly ground, and levigated till a specific surface area was 330 $m^2$/Kg, and are uniformly mixed to obtain low-calcium silicate cement raw meal. The raw meal contained 60% of calcium oxide, 32% of silica, 5.5% of alumina, and 2.5% of iron oxide, a sum being 100% based on the mass of oxides.

The above low-calcium silicate cement raw meal was put in a rotary or shaft kiln and calcined at 1100° C. for 60 min, and then quick cooled in water with the temperature reduced at 300° C. per minute, thereby obtaining low-calcium silicate cement clinker.

The above low-calcium silicate cement clinker was ground, and levigated till a specific surface area was 450 $m^2$/Kg, thereby obtaining a low-calcium silicate cement.

A certain amount of water was added into the above low-calcium silicate cement with a water-solid mass ratio being 0.3, the cement was compressed into a test block of 2×2×2 cm, the test block was placed in an agitated reactor with introduced $CO_2$ gas for carbonization at 90° C. for 1d, the compressive strength of the test block was 17.5 MPa, and after carbonization for 3d, the compressive strength of the test block was 28.2 MPa.

Embodiment 3

Limestone, clay and iron powder commonly used in the current silicate cement-manufacturing plants were selected as raw materials, wherein a calcareous raw material was 1000 g, including 50% of calcium oxide; an argillaceous raw material was 588 g, including 68% of silica and 12% of alumina, respectively; an iron oxide raw material was 66 g, including 45% of iron oxide. The above-mentioned three raw materials were crushed respectively, so that the particle diameter was less than 10 mm, and then the raw materials were mixed, jointly ground, and levigated till a specific surface area was 350 m²/Kg, and are uniformly mixed to obtain low-calcium silicate cement raw meal. The raw meal contained 50% of calcium oxide, 40% of silica, 7% of alumina, and 3% of iron oxide, a sum being 100% based on the mass of oxides.

The above low-calcium silicate cement raw meal was put in a rotary or shaft kiln and calcined at 1150° C. for 30 min, and then subjected to natural cooling in air with the temperature reduced at 300° C. per minute, thereby obtaining low-calcium silicate cement clinker.

The above low-calcium silicate cement clinker was ground, and levigated till a specific surface area was 500 m²/Kg, thereby obtaining a low-calcium silicate cement.

A certain amount of water was added into the above low-calcium silicate cement with a water-solid mass ratio being 0.3, the cement was compressed into a test block of 2×2×2 cm, the test block was placed in an agitated reactor with introduced $CO_2$ gas for carbonization at 120° C. for 1d, the compressive strength of the test block was 18.4 MPa, and after carbonization for 3d, the compressive strength of the test block was 32.7 MPa.

Embodiment 4

Limestone, clay and iron powder commonly used in the current silicate cement-manufacturing plants were selected as raw materials, wherein a calcareous raw material was 1100 g, including 50% of calcium oxide; an argillaceous raw material was 515 g, including 68% of silica and 12% of alumina, respectively; an iron oxide raw material was 88 g, including 45% of iron oxide. The above-mentioned three raw materials were crushed respectively, so that the particle diameter was less than 10 mm, and then the raw materials were mixed, jointly ground, and levigated till a specific surface area was 350 m²/Kg, and are uniformly mixed to obtain low-calcium silicate cement raw meal. The raw meal contained 55% of calcium oxide, 35% of silica, 6% of alumina, and 4% of iron oxide, a sum being 100% based on the mass of oxides.

The above low-calcium silicate cement raw meal was put in a rotary or shaft kiln and calcined at 1300° C. for 30 min, and then subjected to natural cooling in air, thereby obtaining low-calcium silicate cement clinker.

The above low-calcium silicate cement clinker was ground, and levigated till a specific surface area was 500 m²/Kg, thereby obtaining a low-calcium silicate cement.

A certain amount of water was added into the above low-calcium silicate cement with a water-solid mass ratio being 0.3, the cement was compressed into a test block of 2×2×2 cm, the test block was placed in an agitated reactor with introduced $CO_2$ gas for carbonization at 150° C. for 1d, the compressive strength of the test block was 19.1 MPa, and after carbonization for 3d, the compressive strength of the test block was 38.2 MPa.

Embodiment 5

Limestone, clay and iron powder commonly used in the current silicate cement-manufacturing plants were selected as raw materials, wherein a calcareous raw material was 1040 g, including 50% of calcium oxide; an argillaceous raw material was 605 g, including 68% of silica and of 12% alumina, respectively; an iron oxide raw material was 22 g, including 45% of iron oxide. The above-mentioned three raw materials were crushed respectively, so that the particle diameter was less than 10 mm, and then the raw materials were mixed, jointly ground, and levigated till a specific surface area was 350 m²/Kg, and are uniformly mixed to obtain low-calcium silicate cement raw meal. The raw meal contained 52% of calcium oxide, 40% of silica, 7% of alumina, and 1% of iron oxide, a sum being 100% based on the mass of oxides.

The above low-calcium silicate cement raw meal was put in a rotary kiln or shaft kiln and calcined at 1300° C. for 30 min, and then subjected to natural cooling, thereby obtaining low-calcium silicate cement clinker.

The above low-calcium silicate cement clinker was ground, and levigated till a specific surface area was 500 m²/Kg, thereby obtaining a low-calcium silicate cement.

A certain amount of water was added into the above low-calcium silicate cement with a water-solid mass ratio being 0.3, the cement was compressed into a test block of 2×2×2 cm, the test block was placed in an agitated reactor with introduced $CO_2$ gas for carbonization at 180° C. for 1d, the compressive strength of the test block was 20.4 MPa, and after carbonization for 3d, the compressive strength of the test block was 39.2 MPa.

Embodiment 6

Limestone, clay and iron powder commonly used in the current silicate cement-manufacturing plants were selected as raw materials, wherein a calcareous raw material was 1040 g, including 50% of calcium oxide; an argillaceous raw material was 605 g, including 68% of silica and 12% of alumina, respectively; an iron oxide raw material was 22 g, including 45% of iron oxide. The above-mentioned three raw materials were crushed respectively, so that the particle diameter was less than 10 mm, and then the raw materials were mixed, jointly ground, and levigated till a specific surface area was 350 m²/Kg, and are uniformly mixed to obtain low-calcium silicate cement raw meal. The raw meal contained 52% of calcium oxide, 40% of silica, 7% of alumina, and 1% of iron oxide, a sum being 100% based on the mass of oxides.

The above low-calcium silicate cement raw meal was put in a rotary kiln or shaft kiln and calcined at 1300° C. for 30 min, and then subjected to natural cooling, thereby obtaining low-calcium silicate cement clinker.

The above low-calcium silicate cement clinker was ground, and levigated till a specific surface area was 500 m²/Kg, thereby obtaining a low-calcium silicate cement.

A certain amount of water was added into the above low-calcium silicate cement with a water-solid mass ratio being 0.1, the cement was compressed into a test block of 2×2×2 cm, the test block was placed in an agitated reactor with introduced $CO_2$ gas for carbonization at 90° C. for 1d, the compressive strength of the test block was 16.5 MPa, and after carbonization for 3d, the compressive strength of the test block was 26.2 MPa.

Embodiment 7

Limestone, clay and iron powder commonly used in the current silicate cement-manufacturing plants were selected as raw materials, wherein a calcareous raw material was 1040 g, including 50% of calcium oxide; an argillaceous raw material was 605 g, including 68% of silica and 12% of alumina, respectively; an iron oxide raw material was 22 g, including 45% of iron oxide. The above-mentioned three raw materials were crushed respectively, so that the particle diameter was less than 10 mm, and then the raw materials were mixed, jointly ground, and levigated till a specific surface area was 350 m²/Kg, and are uniformly mixed to obtain low-calcium silicate cement raw meal. The raw meal contained 52% of calcium oxide, 40% of silica, 7% of alumina, and 1% of iron oxide, a sum being 100% based on the mass of oxides.

The above low-calcium silicate cement raw meal was put in a rotary kiln or shaft kiln and calcined at 1300° C. for 30 min, and then subjected to natural cooling, thereby obtaining low-calcium silicate cement clinker.

The above low-calcium silicate cement clinker was ground, and levigated till a specific surface area was 500 m²/Kg, thereby obtaining a low-calcium silicate cement.

A certain amount of water was added into the above low-calcium silicate cement with a water-solid mass ratio being 0.15, the cement was compressed into a test block of 2×2×2 cm, the test block was placed in an agitated reactor with introduced $CO_2$ gas for carbonization at 280° C. for 1d, the compressive strength of the test block was 28.5 MPa, and after carbonization for 3d, the compressive strength of the test block was 52.2 MPa.

Embodiment 8

Limestone, clay and iron powder commonly used in the current silicate cement-manufacturing plants were selected as raw materials, wherein a calcareous raw material was 1000 g, including 50% of calcium oxide; an argillaceous raw material was 600 g, including 68% of silica and 12% of alumina, respectively; an iron oxide raw material was 45 g, including 45% of iron oxide. The above-mentioned three raw materials were crushed respectively, so that the particle diameter was less than 10 mm, and then the raw materials are mixed, jointly ground, and levigated till a specific surface area was 300 m²/Kg, and are uniformly mixed to obtain low-calcium silicate cement raw meal. The raw meal contained 50% of calcium oxide, 41% of silica, 7% of alumina, and 2% of iron oxide, a sum being 100% based on the mass of oxides.

The above low-calcium silicate cement raw meal was put in a rotary kiln or shaft kiln and calcined at 1050° C. for 90 min, and then quick cooled in air with the temperature reduced at 200° C. per minute, thereby obtaining low-calcium silicate cement clinker. Smoke generated in the calcining process had a temperature of about 200-280° C., wherein volume content of $CO_2$ was about 20-30%.

The above low-calcium silicate cement clinker was ground, and levigated till a specific surface area was 400 m²/Kg, thereby obtaining a low-calcium silicate cement.

A certain amount of water was added to the above low-calcium silicate cement with a mass ratio of the water to the solid (hereinafter referred to as water-solid ratio) being 0.25, and the cement was compressed into a test block of 2×2×2 cm, the smoke discharged from the preheater at the kiln tail of the cement kiln in the preceding step was introduced into an agitated reactor in which the test block was placed, carbonizing was performed at 220° C. for 1d, and the volume expansion ratio and compressive strength of the test block were 5.3% and 19.2 MPa, respectively. After the test block was carbonized at the same temperature for 3d, the volume expansion ratio and compressive strength of the test block were 7.1% and 32.7 MPa, respectively.

It can be seen from the aforementioned embodiments 1-8 that the invention can choose a low-calcium calcareous raw material to obtain low-calcium silicate clinker, and obtain an early-strength low-calcium silicate cement by a carbonization hardening method.

What is claimed is:

1. A preparation method of a low-calcium silicate cement, wherein raw materials consists of calcium carbonate that includes calcium oxide, a clay material that includes silica and alumina, and an iron oxide material that includes iron oxide; the low-calcium silicate cement comprising 50-60% of calcium oxide, 30-45% of silica, 2-7% of alumina, and 1-4% of iron oxide;

wherein the preparation method comprising the following steps:
   i) crushing, grounding and uniformly mixing the raw materials to obtain a low-calcium silicate cement raw meal;
   ii) calcining the low-calcium silicate cement raw meal at 1050-1300° C. for 30-90 min, and cooling to obtain a low-calcium silicate cement clinker;
   iii) levigating the low-calcium silicate cement clinker till a specific surface area is 400-500 m²/Kg, thereby obtaining the low-calcium silicate cement.

2. The preparation method according to claim 1, characterized in that the crushing and grounding in the step i) makes the particle diameter of the raw materials be less than 10 mm.

3. The preparation method according to claim 1, characterized in that the levigating the low-calcium silicate cement clinker till a specific surface area is up to 300-350 m²/Kg in the step iii).

4. The preparation method according to claim 1, characterized in that the cooling in the step ii) is quick cooling or natural cooling.

* * * * *